Nov. 5, 1957     B. E. ROETHELI     2,812,244
APPARATUS FOR CONTACTING SOLIDS WITH GASEOUS FLUIDS
Original Filed Aug. 26, 1950
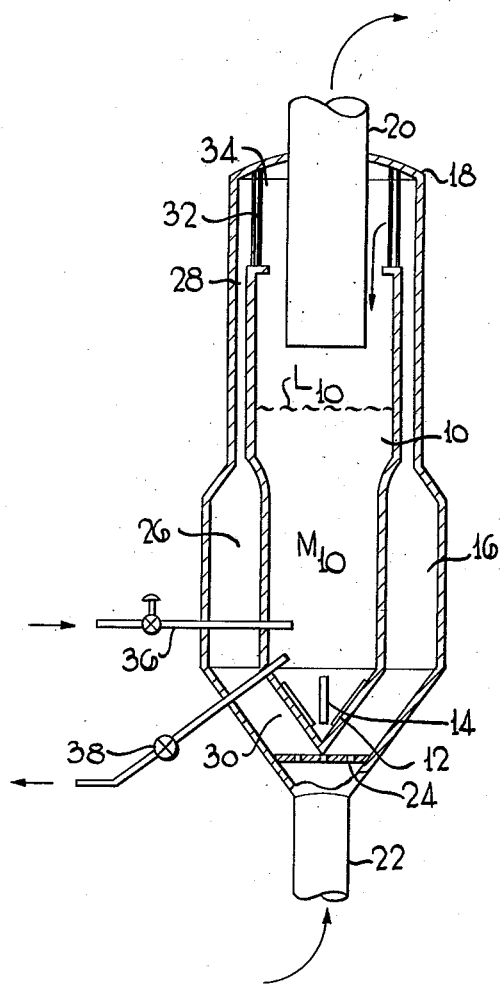
Bruno E. Roetheli Inventor
By George J. Silvany Attorney United States Patent Office 2,812,244
Patented Nov. 5, 1957

2,812,244

APPARATUS FOR CONTACTING SOLIDS WITH GASEOUS FLUIDS

Bruno E. Roetheli, Putney, London, England, assignor to Esso Research and Engineering Company, a corporation of Delaware Original application August 26, 1950, Serial No. 181,659. Divided and this application September 1, 1955, Serial No. 536,243

6 Claims. (Cl. 23—288)

This invention relates to contacting solid particles with gaseous fluid and, more particularly, relates to apparatus for carrying out treatments and reactions in which high concentrations of subdivided solids and relatively short contact or reaction times are used, such as the catalytic dehydrogenation of hydrocarbons, thermal cracking of hydrocarbons to produce acetylenic compounds, demethanation of ketones, etc.

This application is a division of application Serial No. 181,659, filed August 26, 1950, and now abandoned.

Prior to the present invention, it has been difficult to carry out operations in which high concentrations of solids and short contact or reaction times are used as, for example, in the catalytic dehydrogenation of butenes to produce butadiene. While the invention will be specifically described in connection with the catalytic dehydrogenation of butenes, it is to be understood that the invention may be used with other processes for treating hydrocarbons or other organic material or inorganic material.

In the catalytic dehydrogenation of butenes to produce butadiene, it is necessary to expose butene at reaction temperature to a relatively large amount of catalyst and at the same time limit the time of contact of the butene with the catalyst a reaction temperature to a minimum to minimize side reactions or thermal cracking.

The fluidized solids type of reactor is useful in certain reactions in which high concentrations of subdivided solid particles are obtained by selecting low velocities of gaseous fluid or reactant passing upwardly through the solids. However, if such a reactor were used in the catalytic dehydrogenation of butene on a commercial scale, the reactor would be quite large in cross-section with a very shallow dense phase of catalyst. To prevent excessive carry-over of catalyst from the reactor, it would be necessary to have a large settling zone above the dense phase in the reactor and this would result in too much time of contact or reaction time of the butenes or other reactants at the high temperature. Attempts at accomplishing the separation of solids and gases immediately following the dense phase have led to the use of cyclone separators reached by the solids-in-gas suspension over an extended tortuous path in the form of pipes having large bends whereby the contact time was extended substantially beyond the desired maximum of, say 2–3 seconds.

The present invention overcomes the aforementioned difficulties and affords various additional advantages as will appear from the description given hereinafter with reference to the accompanying drawing.

In accordance with the present invention, the subdivided solids are passed, at the high rate required to establish the desired high density, under the pseudo-hydrostatic pressure of a vertical column of the solids maintained in a readily flowing condition by the addition of small amounts of an aeration gas, into the lower portion of an annular vertical reaction zone surrounding said column over its entire length, said reaction zone having a relatively low velocity lower portion and a relatively high velocity upper portion, the latter extending upwardly beyond the upper level of said column. The gasiform fluid to be treated is admitted to the bottom of the low velocity portion of the reaction zone at a rate adequate to maintain the desired dense solids phase therein and a combined contact time in said lower and upper portions not exceeding that desired for the treatment involved. The velocity differential within the successive portions of the reaction zone is established by providing substantially less free cross-sectional area in the upper portion than in the lower portion of the reaction zone.

The high velocity, relatively dilute, suspension of solids in gasiform material is passed from the upper portion of the reaction zone in swirling motion directly into a low velocity zone in the form of a confined free space located directly above, and in open connection with, the upper level of the solids feed column and at least partially surrounded by the upper portion of the reaction zone. As a result of the swirling motion and the drop in velocity, gas-solids separation takes place in the free space above the solids feed column, separated solids falling into the feed column. The treated gasiform fluid now containing solids in a substantially ineffective low concentration is removed from the free space at a relatively low velocity to be passed to further gas-solids separation and product recovery. In this manner, extensive gas-solids contact in dilute low velocity phases prior to solids separation and in pipe bends is substantially eliminated.

Suitable operating conditions may vary within wide ranges depending on the treatment involved and the character of the solids used. Quite generally, it may be stated that the invention contemplates solid particle sizes including particles of 1 to 200 microns diameter; solids to gas feed ratios to the reaction zone of about 1 to 25 lbs. of solids per cu. ft. of gas depending on the specific reaction and catalyst activity involved; phase densities in the low velocity portion of the reaction zone of about 6 to 35 lbs. per cu. ft. and of about 2 to 30 in the high velocity portion when using superficial linear gas velocities of about 0.5 to 50 ft. per second, preferably 3 to 50 ft. per second, in the reaction zone; apparent densities of the solids feed column of about 20 to 50 lbs. per cu. ft.; and a solids entrainment in the gaseous products removed from above the solids feed column of about 0.005 to 0.2 lb. per cu. ft. or higher depending on the actual density of the catalyst.

When the invention is applied to treatments or reactions requiring continuous solids regeneration, spent solids may be withdrawn from the solids feed column, subjected to regeneration and returned to the reaction zone together with the feed gases. Alternatively or simultaneously, solids separated from the dilute suspension leaving the free space above the solids feed column may be passed to regeneration and returned to the reaction zone together with the feed gases.

Having set forth its objects and general nature the invention will be best understood from the more detailed description hereinafter in which reference will be made to the drawing, the single figure of which illustrates a preferred embodiment of the invention.

Referring now to the drawing, the apparatus illustrated comprises a vertical substantially cylindrical vessel 10 open at the top and having a closed conical bottom 12 provided with a plurality of oblong orifices 14 extending over at least a major portion of the length of cone 12. Orifices 14 are preferably adjustable. Vessel 10 is surrounded by a jacket 16 having a generally similar outline as vessel 10, but over its entire length a larger diameter than adjacent portions of vessel 10 so that a vertical free space is formed between jacket 16 and vessel 10 over the entire length of the latter. Jacket 16 extends upwardly beyond the open top of vessel 10 and ends in a rounded cone cover 18, fitting in pressure-tight connection around a vertical concentrical tube 20 extending downwardly a substantial distance into the upper portion of vessel 10. The diameter of tube 20 is about ⅛–⅔ of that of the portion of vessel 10 penetrated by tube 20. The lower conical portion of jacket 16 is continued by a feed pipe 22. The lower conical portion 30 of the space between vessel 10 and jacket 16 is separated from feed pipe 22 by a gas distributing means, such as a perforated grid 24.

Vessel 10 and jacket 16 are so shaped that the vertical annular space formed by the same has a lower portion 26 of relatively large cross-section and an upper portion 28 of relatively small cross-section. This may be accomplished as shown in the drawing by recessing vessel 10 inwardly and/or expanding jacket 16 outwardly below the transition line between portions 26 and 28. The width of portion 26 may be about 2–10 times that of portion 28. Portion 30 may have about the same width as portion 26. The lengths of portions 30, 26 and 28 may be chosen in any suitable manner, for example in the approximate ratio of 1:2:2, in the order named.

If desired, portion 26 and/or portion 28 may be so designed that they are vertically moveable in a telescoping fashion to permit an adjustment of the ratio of their lengths as determined by the conditions of the specific reaction involved. Portions 26, 28 and 30 may also be made of substantially equal cross-section in which case velocity differentials may be established by placing suitable fillers in the high velocity sections.

A plurality of vertical baffles or vanes 32 are arranged immediately above portion 28 within the free space between the upper portion of jacket 16 and the middle section of tube 20, close to the wall of jacket 16, in such a manner that a violently swirling action is imparted to the gases entering space 34 from portion 28. Vanes 32 may have the form of flat or curved plates placed at an angle (less than a right angle) to the flow of the gas-solids mixture leaving the high velocity zone. A gas bleed line 36 is provided in the lower portion of vessel 10 at a point above orifices 14, adapted to supply small amounts of an aeration gas to vessel 10. A solids withdrawal line 38 may be arranged in a lower portion of vessel 10 to carry solids from vessel 10 to any point outside jacket 16.

In operation, vessel 10 contains a bed $M_{10}$ of subdivided contact solids maintained by aeration gas fed through line 36 in a readily flowing condition and having a well defined upper level $L_{10}$ just below the lower end of tube 20. Solids flow under the pseudo-hydrostatic pressure of mass $M_{10}$ through orifices 14 into portion 30 of the annular space at a rate controlled by adjustment of the variable orifices 14. The gas to be treated is admitted through line 22 and grid 24 at a rate adequate to form the desired solids density and to establish the desired contact therein in portions 30 and 26 which represent the principal portions of the treatment or reaction zone proper. The relatively dense upflowing suspension of solids-in-gases then enters portion 28 wherein its velocity is greatly increased with a corresponding decrease in density. The high velocity suspension discharged from portion 28 enters space 34 in centrifugal strongly swirling motion imparted by vanes 32 so that space 34 acts as a cyclone-type of separator. Separated solids collect on level $L_{10}$ to be recirculated to the annular treating space while treated gases leave through tube 20 at a relatively low velocity not conducive to excessive solids entrainment. Fresh solids may be supplied with the feed gases through pipe 22 and spent solids may be withdrawn through line 38 as desired. It will be readily appreciated that in this manner, any desired contact time and solids density may be maintained by merely adjusting the gas feed rate and the opening of orifices 14 while avoiding undesirable delays in the gas-solids contact as the result of extended residence in dilute low velocity phases and/or in pipe bends.

The invention will be further illustrated by the following more specific example wherein reference will be made to the dehydrogenation of butenes to butadiene. It will be understood, however, that the method and apparatus of the invention may be applied in a generally analogous manner to other catalytic or non-catalytic contacting of solids with gases requiring high phase densities and short contact times.

The butenes to be dehydrogenated are passed through line 22 into the bottom portion 30 of the reaction zone. For maximum production of butadienes the butene feed comprises butenes 1 and 2 of reasonably high purity. Where the catalyst is deactivated by steam, the use of steam should be avoided and a subatmospheric pressure is preferably used for maintaining a low partial pressure rather than steam, or inert diluents may be used to get low $C_4$=partial pressure.

The butene feed may be preheated to a temperature of about 800°–1000° F., but this is not essential since with one type of catalyst the heat for the process may be supplied from the combustion of carbonaceous matter in a regenerator (not shown). The catalyst may comprise any suitable dehydrogenation catalyst, such as oxides of (1) chromium or aluminum or mixtures thereof, (2) iron, magnesium, copper or potassium or mixtures thereof, (3) vanadium, tungsten or molybdenum or mixtures thereof, etc. Regenerated catalyst heated to about a temperature of 1300°–1500° F., preferably about 1400° F., may be supplied together with the butene.

For catalysts in groups (1) and (3) the regeneration is carried out with air and in the absence of steam. For catalysts in group (2) steam is used for regeneration for removing coke or carbonaceous material by the water gas reaction. About 10–20 mols of superheated steam per mol of feed should be used for regeneration. The temperature during regeneration with steam is about 1200° F. to 1400° F. Heat in addition to that supplied by catalyst in the reaction zone is preferably supplied by superheated steam heated to a temperature above about 1200° F. When using a catalyst containing potassium, it may be desirable to add a potassium compound to replace the potassium lost during the process. Suitable dehydrogenating conditions to be maintained in portion 26 include temperatures of about 800°–1500° F. and pressures of about up to 100 p. s. i. g.

Where regeneration temperatures are much higher than the reaction temperature, the butene feed may be heated to a lower temperature to avoid thermal cracking and when it is mixed with the regenerated catalyst at a higher temperature, the butene feed is raised to the cracking temperature almost instantaneously. Also the steam may be heated to temperatures higher than reaction temperatures before being introduced into the reaction zone to supply heat to the butene feed.

The catalyst in bed $M_{10}$ is preferably in finely divided or pulverized form of a size between about 50 and 400 standard mesh. However, substantially coarser particles up to diameters of ⅛″ or ¼″ may be used. The butene feed passing upwardly through the reaction zone maintains the catalyst particles in a dry fluidized liquid-simulating condition. When using a catalyst of about 100 to 400 standard mesh the dense fluidized mixture in portions 30 and 26 of the reaction zone will have a density between about 10 lbs. per cubic foot and 50 lbs. or more per cubic foot, depending on the rate of addition of catalyst to the reaction zone relative to the vapor rate, and upon the physical characteristics of the catalyst.

The velocity of the butene vapors passing up through portions 30, 26 and 28 of the reaction zone may vary between about 3 ft. per second to 50 ft. per second. When the catalyst used comprises chromia and alumina and the velocity of the butene vapors in zone 26 is about 20 ft. per second, the density of the fluidized mixture in portion 26 of the reaction zone will be about 30 lbs. per cubic foot when catalyst is added to the reaction zone from vessel 10 at the rate of about 15–20 lbs. for each cubic foot of vapor introduced. At these conditions the gas velocity in zone 28 may be upwards of 50 ft. per second. Lower gas velocities within the range of 5–20 ft. per second may be used in portion 26 when the reaction zones are shortened correspondingly. The reaction time or time of contact of the butene feed with the catalyst particles from the distribution plate 24 to the separating space 34 may vary between about 0.1 second to 10 seconds, preferably about 0.1 to 2.0 seconds.

From the above it will be seen that the butene feed passes through the reaction zone at a high velocity, and in order to maintain catalyst within the reaction zone or vessel it is necessary to feed a large amount of catalyst particles to the reaction zone. Part of this catalyst is fed in the form of hot regenerated catalyst particles. The major portion is supplied by recirculation from the separating space 34 through the catalyst column of bed $M_{10}$ in vessel 10. As a result of the intimate heat exchange between bed $M_{10}$ and the annular reaction zone, the catalyst in bed $M_{10}$ has approximately the same temperature as the reaction zone whereby the heat economy of the system is greatly aided. Due to the high velocity of the vapors and to the feeding of the large amount of catalyst particles to the reaction zone, the reaction zone is completely flooded with catalyst in the dense phase of zones 30 and 26 and the gaseous products passing overhead through these zones are in a dense phase or mixture. Zone 28 is really an overflow pipe which facilitates more speedy removal of the dense phase mixture from the top portion of the reaction zone 26.

Catalyst separated in space 34 is collected on level $L_{10}$ substantially at the rate at which catalyst is withdrawn through orifices 14. At the conditions of the present example, bed $M_{10}$ may have a density of about 40–50 lbs. per cu. ft. About 2–10 lbs. of superheated steam per sq. foot of vessel area per hour may be injected through line 36 for aeration to maintain bed $M_{10}$ at this density and in free-flowing condition.

Gaseous reaction products leaving space 34 through tube 20 may be quenched to a temperature of about 500°–1000° F. by injecting water or any other conventional quenching medium, preferably after a secondary stage of gas-solids separation (not shown). The reaction products in gaseous form leaving the last-mentioned separating means are passed to any suitable equipment for recovering desired products. Where butadiene is to be recovered, the reaction products are treated with a solvent which is selective for butadiene and the butadiene is then separated from the solvent. Catalyst separated outside the unit shown may be returned to line 22 or to the regeneration stage. An amount of about 1–10% of circulating catalyst may be withdrawn through line 38 and passed to the regenerator to be returned therefrom via line 22 at substantially the same rate, as indicated above.

During regeneration which may be carried out in any conventional fluid-type of operation, the temperature is maintained between about 1000° and 1500° F. As the regeneration reaction is exothermic when using air, the temperature during regeneration must be controlled to prevent deactivation of the catalyst. This may be accomplished by inserting an indirect heat exchange coil in the dense fluidized phase of the regenerator or a portion of the regenerated catalyst may be withdrawn from the dense phase, cooled and returned to the regeneration zone all in a manner known per se. Other ways of controlling the temperature in the regeneration zone may be used. If insufficient combustible material is deposited on the particles to satisfy the heat requirements, extraneous fuel may be injected into the regenerating vessel to supply the additional heat by combustion.

When regenerating with steam, the steam is heated to a higher temperature than reaction temperature and in addition to steam fuel may be burned in the regeneration zone to supply the heat necessary to raise the temperature of the catalyst particles to above reaction temperature in the reactor.

The present invention may also be used with non-catalytic solid particles where the particles are used primarily for controlling the temperature in the reaction zone by heating or cooling as the case may be. The invention may be used in all cases where large amounts of solid particles are to be maintained in a treating zone, while the particles are being continuously removed therefrom, and where the gaseous fluid passes through the treating zone at a relatively high velocity or where the time of contact between the solid particles and gaseous fluid in the treating zone is exceedingly short.

While one form of apparatus has been shown and conditions for one catalytic reaction, namely, catalytic dehydrogenation of butenes to produce butadiene have been given, it is to be understood that these are by way of example only and various changes and modifications may be made without departing from the spirit of the invention.

What is claimed is:

1. Apparatus for contacting gaseous fluids with subdivided solids using large amounts of solids and short contact times, which comprises a vertical substantially cylindrical vessel open at the top, said vessel having a closed inverted conical bottom provided with a plurality of oblong orifices extending over a substantial portion of the length of said inverted conical bottom, a jacket surrounding said vessel over its entire length in a spaced relationship to define a vertical annular space of width substantially smaller than the diameter of said vessel, said jacket being closed at top and bottom and extending upwardly beyond the open end of said vessel to define a confined space within said jacket above said vessel, the width of said annular space being 2 to 10 times greater in its lower portion than in its upper portion, the lengths of the lower and upper portions of said annular space being in a ratio between about 1:1 and 3:2, a gas feed pipe leading into the bottom of said jacket, separating means communicating with the upper portion of said annular space and adapted to rapidly separate subdivided solids from gaseous fluid and to return the separated solids to said cylindrical vessel, and a tube communicating with said separating means and adapted for removal of gaseous fluid therefrom.

2. The apparatus of claim 1 which comprises a gas feed line leading into a lower portion of said vessel, and wherein said separating means is a plurality of vanes arranged in said confined space adjacent to said jacket and annular space.

3. The apparatus of claim 1 in which said orifices are adjustable.

4. The apparatus of claim 1 which comprises a pipe connecting the bottom of said vessel to the outside, said last-mentioned pipe being adapted to carry subdivided aerated solids from said vessel to the outside.

5. The apparatus of claim 1 which comprises a perforated horizontal grid separating the bottom of said annular space from said gas feed pipe.

6. The apparatus of claim 1 in which the diameter of said vertical tube is about 1/8–2/3 of that of the upper portion of said vessel.

References Cited in the file of this patent
UNITED STATES PATENTS

| | | |
|---|---|---|
| 2,488,406 | Hirsch | Nov. 15, 1949 |
| 2,515,155 | Munday | July 11, 1950 |